Figure 1:
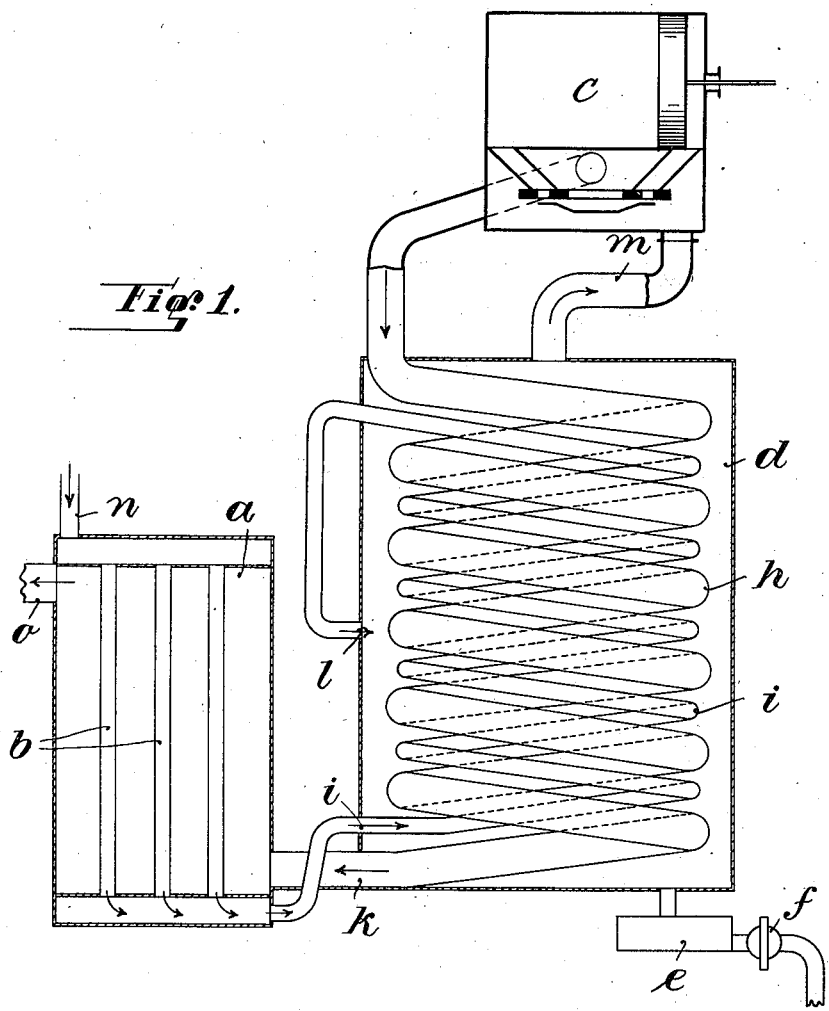

R. MEWES.
PROCESS OF LIQUEFYING GAS MIXTURES AND FOR SEPARATING THE CONSTITUENTS.
APPLICATION FILED MAY 12, 1913.

1,188,191.

Patented June 20, 1916.
2 SHEETS—SHEET 2.

WITNESSES

INVENTOR
RUDOLF MEWES
BY
ATTORNEYS

UNITED STATES PATENT OFFICE.

RUDOLF MEWES, OF BERLIN, GERMANY.

PROCESS OF LIQUEFYING GAS-MIXTURES AND FOR SEPARATING THE CONSTITUENTS.

1,188,191.   Specification of Letters Patent.   Patented June 20, 1916.

Application filed May 12, 1913. Serial No. 767,030.

*To all whom it may concern:*

Be it known that I, RUDOLF MEWES, a subject of the King of Prussia, residing at Berlin, in the Kingdom of Prussia and German Empire, have invented new and useful Improvements in Processes of Liquefying Gas-Mixtures and for Separating the Constituents, of which the following is a specification.

My invention relates to improvements in the process for liquefying and separating gases which are difficult to condense, especially air, by adiabatic expansion and primary cooling of the fresh gas by the gases passing off, the process being carried out in such a manner that the mixed liquid formed before the point of expansion is not allowed to escape, but is separated into its constituents before the point of expansion by repeated condensation and vaporization, so that practically only the less volatile constituent passes into the expansion engine or the like. This constituent is then led in known manner in counter current to the fresh operating agent and is either allowed to escape into the atmosphere or into a suction chamber or to a pump.

In order to obtain as good a separation as possible, for example of air into nitrogen or oxygen, the multiple distillation and condensation before the point of expansion is carried out in such a manner that the liquid trickling down and the rising vapors are alternately heated and cooled, so that a separation is effected by repeated distillation and condensation.

In order to obtain as high a degree of purity as possible, for example pure oxygen and pure nitrogen in treating air, the liquefaction may be caused to take place chiefly in two liquefaction coils in such a manner that from the deepest point of the column, where there is nearly pure oxygen in gaseous form, a pipe leads to the coldest point, that is into a chamber shortly before the point of exhaust, and from thence passes in coils leading downward, being then connected by a pipe with the middle part of the column, the end of said pipe being either straight or bent round so as to form a liquid seal. The second coil passes from a point of the pressure pipe near the engine into the same chamber and is there coiled downward or through an exchange apparatus, then leads to the top of the rectification column, where it is preferably bent round so as to form a liquid seal. By this construction the result is obtained that in the middle part of the column there is nearly pure liquid oxygen and in the upper part nearly pure liquid nitrogen, so that a perfect separation is rendered possible by multiple distillation and condensation.

Two forms of apparatus for carrying out the invention are shown on the drawing in section by way of example.

Figure 2:
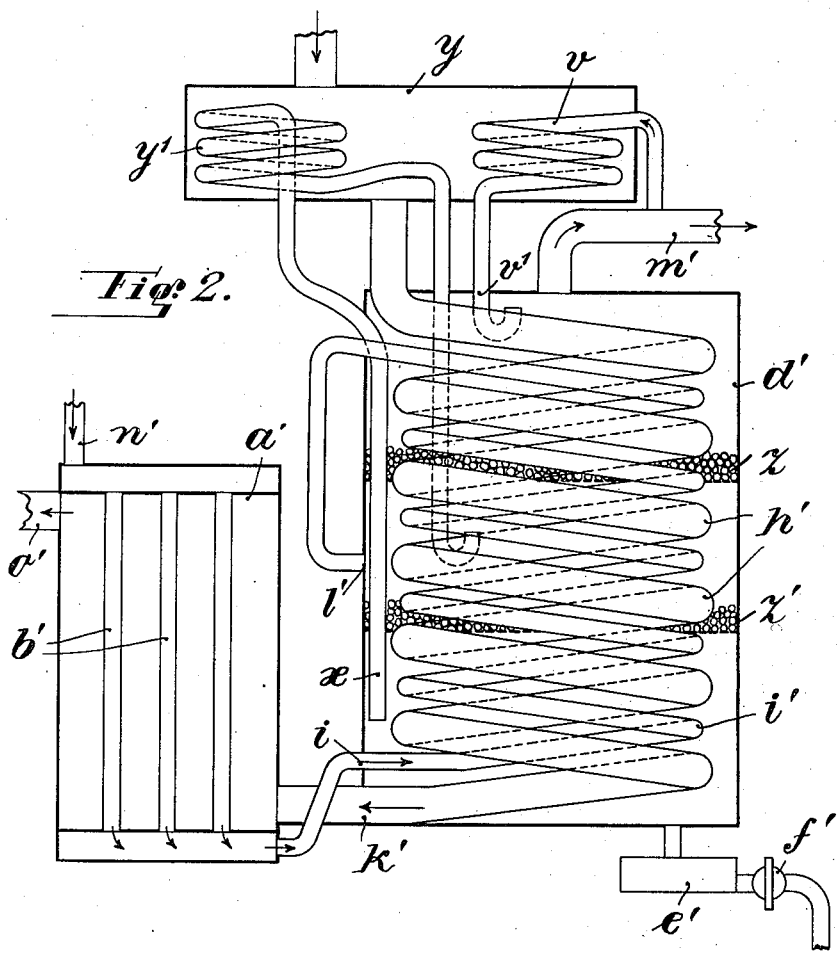

Figure 1 shows a vertical section of an apparatus in which the fluid is alternately heated and cooled in the separating apparatus. Fig. 2 represents in vertical section a modified construction of the apparatus shown in Fig. 1.

In Fig. 1 two coils $h$, $i$ are shown in a column $d$, said coils being spirally wound, with one coil between the other. The cold expanded air from an engine $c$ (Fig. 1), enters the top of the coil $h$ and abstracts heat from the gas in the column $d$, escaping at $k$ into a counter current apparatus $a$, $b$ of any usual construction. The previously somewhat cooled and compressed air 5 to 10 atm., for example, is introduced into the counter current apparatus $a$, $b$ through the pipe $n$ and enters the narrow pipe $i$ and by giving off the heat still contained therein causes the liquid formed in the column $d$ and trickling downward to evaporate again. From the coil $i$ the fluid enters the column $d$ at $l$. The liquid air escaping at $l$, which may eventually contain air in gaseous form is distributed as much as possible over the coils $h$, $i$, the coils $h$ serving to cool the coils $i$ to heat said air. In this column $d$ therefore an alternate evaporation and liquefaction takes place, the coldest temperature being produced at the top of said column.

The compressed gas passing through the pipe $m$ to the cylinder $c$ is reduced nearly to its liquefying temperature by the expanded gas passing through the pipe $h$ from the cylinder $c$, which expanded gas has been cooled through about 40 to 80° C. by its expansion. The compressed gas, in continuous operation of the plant, consists almost entirely of pure nitrogen, when air is being treated, so that the exhaust gas passing through $h$, by its expansion in $c$ must have sunk in temperature somewhat below the boiling point of the nitrogen under higher temperature in the pipe $m$.

The liquid collecting at the bottom of the column at $e$, as soon as the normal working condition is obtained, consists of pure oxygen, which can be allowed to escape through a cock $f$ or into an oxygen evaporator of any suitable construction. The exhaust gases pass off out of the counter current apparatus $a$, $b$ through the opening $o$ to the suction pump.

This process can be further improved when, as shown in Fig. 2, a pipe $x$ is led out of the bottom part of the column $d'$, where there is nearly pure oxygen to an exhaust chamber $y$. The lower end of said pipe $x$ is above the level of the liquid in the column $d'$. The pipe $x$ forms in said chamber $y$ a coil $y'$ and then passes down to the space between two layers of glass beads $z$, $z'$, that is to the place where the fresh air mixture enters through the pipe $l'$. It is preferable to bend round the end of the pipe at this point, in order to form a liquid seal, so that only liquid, and no gas or vapor, can escape. A second pipe can be provided in the exhaust chamber $y$, which pipe is branched off from the pipe leading to the engine. It forms a coil $v$ in said chamber, and then passes to the top of the column $d'$ $v'$, where it is also preferably bent round, so as to form a liquid seal. Circulation in said coils $y'$ and $v$ must take place, because in the chamber $y$ the temperature is lower than in the column $d'$.

The function of the coil $y'$ is to "wash" the nitrogen from all oxygen, or, in other words to enrich the nitrogen. This will be evident on considering that the bottom end of the pipe $x$ is above the level of the liquid in the column $d'$. As the coil $y'$ is exposed to a lower temperature in the chamber $y$ than the bottom end of the pipe $x$, the oxygen will rise in the pipe $x$ and be liquefied in $y'$. The liquid formed will flow down the pipe leading to the middle of the column $d'$ where the temperature is higher than in the pipe $y'$, so that oxygen in issuing from said pipe will evaporate to some extent and assist in lowering the temperature and causing the oxygen still present in the rising gas to liquefy.

The same applies to the coil $v$. Gaseous nitrogen enters this coil from the pipe $m$ and is liquefied in said coil $v$. It then flows back into the column $d'$ where it assists in lowering the temperature and thus assures that any oxygen still present at the top of the column $d'$ is liquefied and descends toward the bottom of said column.

It need not be specially pointed out that this separating process can of course be used for other gas mixtures than air and for vapors also, and that it can be combined with existing gas separating processes.

What I claim and desire to secure by Letters Patent of the United States is:—

1. The described process for separating gases, especially for obtaining nitrogen and oxygen in any degree of purity, which consists in feeding gases under pressure to a point of expansion in counter current to expanded gases coming from said point of expansion, without however mixing said gases, in vaporizing the liquid formed, and in simultaneously alternately heating and cooling the gases given off by the vaporized liquid, substantially as, and for the purpose, set forth.

2. The described process for separating gases consisting in causing gases under pressure to pass to a point of expansion so as to be cooled by the expanded gases coming from said point of expansion, in evaporating the liquid formed, in alternately heating and cooling the gases produced from the evaporated liquid, and in subjecting a portion of the gases evaporating from the liquid to the influence of expanded gases before said gases act on the still uncondensed gases, substantially as, and for the purpose, set forth.

3. The described process for separating air into its constituent gases consisting in causing air under pressure to pass to a point of expansion so as to be cooled by the expanded air coming from said point of expansion, in evaporating the liquid formed, in alternately heating and cooling the gases produced from the evaporated liquid, in subjecting a portion of the oxygen evaporating from the liquid thus formed to the influence of the expanded air before said air acts on the still uncondensed air, and in subjecting a portion of the evaporating nitrogen to the influence of the expanded air before said air acts on the still uncondensed air, substantially as, and for the purpose, set forth.

4. A process of separating gases, which consists in passing the cold and exhaust gases from a point of expansion through a closed conduit in heat exchanging contact with gases in a rectifying column, vaporizing the liquid formed in the rectifying column, and alternately heating and cooling the liquid and vapor in the rectifying column.

5. The process for separating gases which consists in feeding gases under pressure through a rectifying column to a point of expansion, passing the cold and exhaust gases from said point of expansion through a closed conduit in heat exchanging contact with the gases passing through the rectifying column to abstract heat therefrom, vaporizing, by means of the compressed gases passing to the point of expansion, the liquid formed, and alternately heating and cooling the liquid and vapor in the rectifying column by the gases passing to and from the point of expansion.

In testimony whereof I have signed my name to this specification in the presence of two subscribing witnesses.

RUDOLF MEWES.

Witnesses:
WOLDEMAR HAUPT,
HENRY HASPER.